United States Patent [19]

Jurgensen et al.

[11] 4,301,474
[45] Nov. 17, 1981

[54] RESIDUAL CLAMP ERROR COMPENSATION CIRCUIT

[75] Inventors: David J. Jurgensen, Gaston; Roger A. Marin, Portland, both of Oreg.

[73] Assignee: Tektronix, Inc., Beaverton, Oreg.

[21] Appl. No.: 140,379

[22] Filed: Apr. 14, 1980

[51] Int. Cl.³ .............................................. H04N 5/16
[52] U.S. Cl. .................... 358/171; 358/21 V
[58] Field of Search ...................... 358/21 V, 171, 142, 358/145, 147, 181, 182, 183

[56] References Cited

U.S. PATENT DOCUMENTS 3,619,495 11/1971 Ito et al. ............................... 358/182

Primary Examiner—Robert L. Richardson

[57] ABSTRACT

An apparatus for matching the blanking levels of two television video signals is disclosed. When the vertical interval reference signal or any other signal (e.g., sync) is inserted on a program video signal their blanking levels should be matched. The apparatus described accomplishes this by matching the blanking level of the signal being inserted to that of the program video. The match is produced by sampling the residual clamping error of a slow clamp on the program channel and adding it to the signal being inserted. Therefore, the noise which would have been added to the program video is added to the inserted signal instead and therefore will not be visible in the television picture.

10 Claims, 3 Drawing Figures

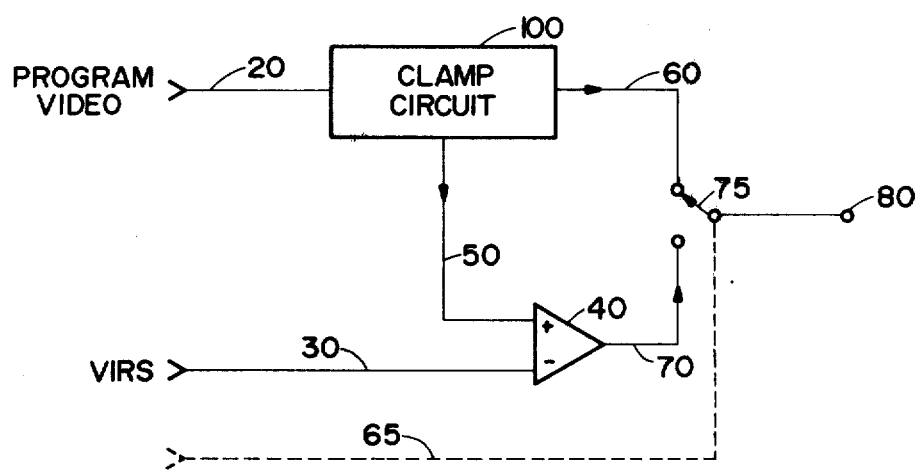
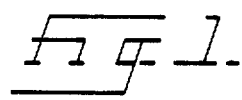
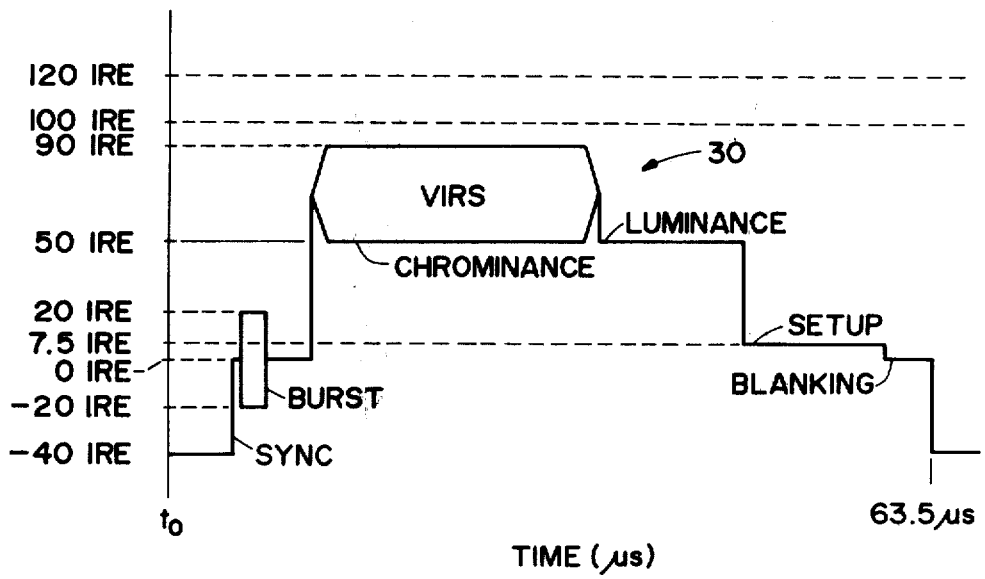
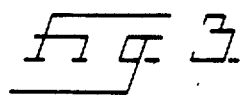

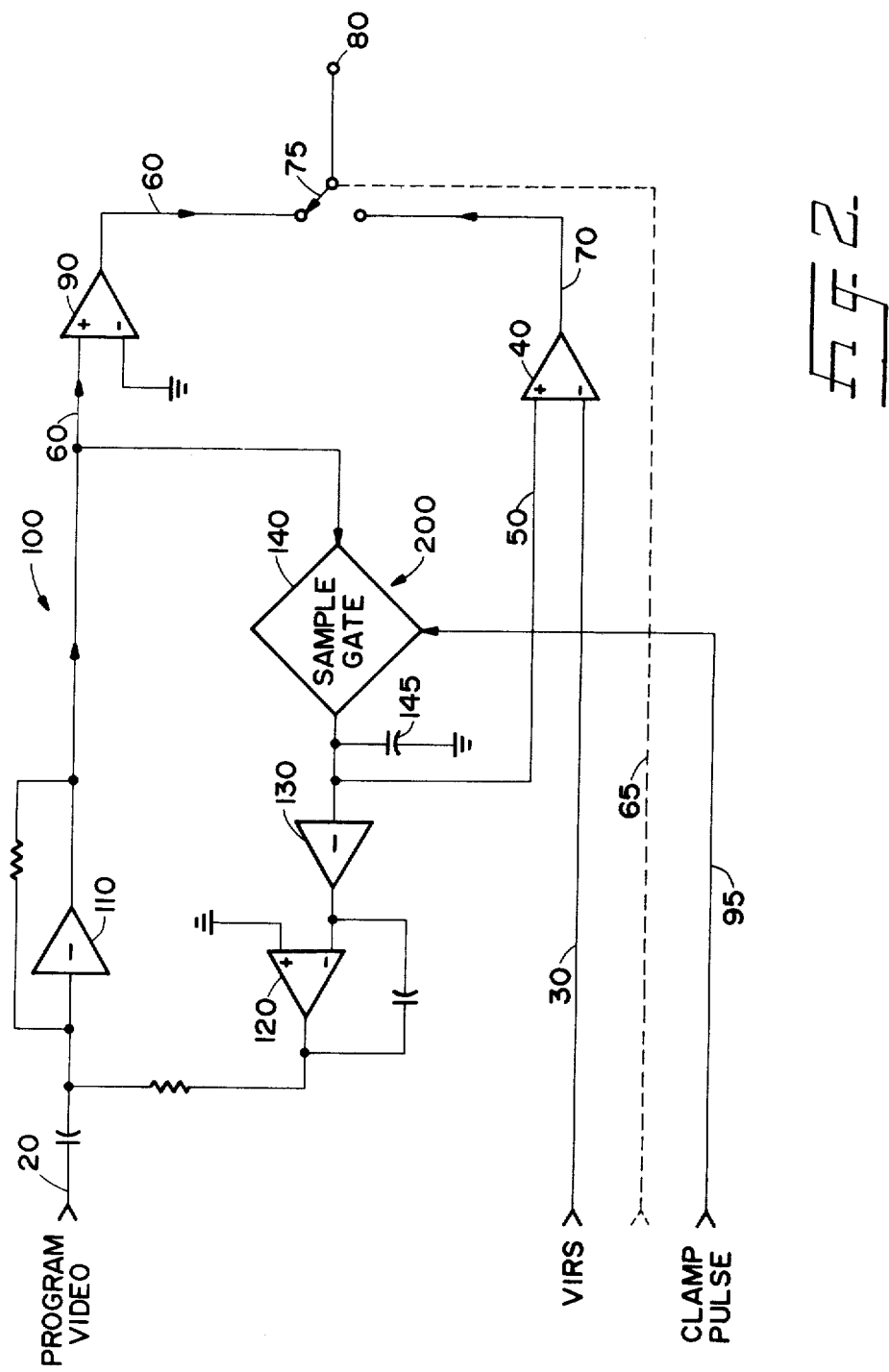

RESIDUAL CLAMP ERROR COMPENSATION CIRCUIT

BACKGROUND OF THE INVENTION

The present invention relates to video clamp circuits and in particular to a circuit for compensating for residual clamp errors. The invention is useful in, but not limited to, the process of inserting a Vertical Interval Reference Signal, hereinafter referred to as VIRS, onto a particular line of a video program signal.

Modern television broadcasting standards require that the transmitted signal parameters such as video gain, sync amplitude, burst amplitude, chrominance/luminance gain ratio, setup level, and burst phase be maintained within specified limits. Some years ago, the visual test patterns transmitted during television station idle periods were deemed inadequate to meet the above modern requirements. Television broadcasters and networks began to transmit the above-mentioned VIRS along with normal television picture signals. The VIRS is transmitted while the channel is in actual operation.

Traditionally, the VIRS has been used to evaluate the transmission characteristics of a channel; for example to determine if the channel is meeting some predetermined quality standard. Thus, if a network program is transmitted over a telephone line, and the telephone company has contracted to provide distortion below a specified level, the VIRS gives an indication as to whether the requirement is being met. When undesirable distortion is found at the receiving end of a transmission channel, certain adjustments can be made at that end to compensate for distortions.

When the VIRS, or any other signal, is inserted on a program video signal it is desirable to closely match the blanking levels of the signals. This is accomplished conventionally by clamping the program video to a reference voltage which is equal to the blanking reference voltage of the VIRS. However, it has been found that a conventional clamp will not completely remove all of the commonly encountered low frequency distortion often present on program video signals. This distortion is visible on the television screen as streaks or lines.

SUMMARY OF THE INVENTION

According to the present invention the blanking level of the signal being inserted is matched to that of the program video signal. The preferred embodiment described is that of a VIRS insertion apparatus. The blanking level match is accomplished by sampling the residual clamping error of a slow clamp on the program channel and applying it to the inserted channel.

It is, therefore, an object of the present invention to provide a circuit which precisely matches an inserted video signal to the program video signal.

It is another object of the present invention to provide a means of matching inserted video to program video wherein the residual clamping noise is added to the inserted video.

The invention both as to organization and method of operation, together with further advantages and objects thereof, may best be understood by reference to the following description taken in connection with the accompanying drawings wherein like reference characters refer to like elements.

DESCRIPTION OF THE DRAWINGS

In the drawings:

FIG. 1 is a simplified block diagram of a preferred embodiment of the present invention;

FIG. 2 is a more detailed block diagram of a preferred embodiment of the present invention; and FIG. 3 is a plot of VIRS parameters with respect to IRE units.

DETAILED DESCRIPTION OF THE PREFERRED EMBODIMENT

Referring to the drawings, and particularly FIG. 1, a simplified block diagram of the present invention is illustrated therein. The following description is directed toward the use of the present invention in a VIRS insertion apparatus. However, as previously mentioned, it may be utilized to match the blanking level of any two video signals. Consequently, the following description should not be taken as limiting of the invention.

The program video signal 20 is first coupled to clamp circuit 100. The program video 20 is typically any composite color video signal. Clamp circuit 100 may comprise a conventional clamp circuit. It has been found that the type of clamp known in the art as a slow clamp is the most efficient in the preferred embodiment. This clamp will be described in detail later. VIRS 30 is coupled to the inverting input of amplifier 40. VIRS 30 is shown in FIG. 2 and is generated by a conventional VIRS generator (not shown) or the like. Such a generator is well known to those skilled in the art and will not be described in detail.

One output of clamp circuit 100 is error voltage 50 which is a sample of the residual error of the clamp. This error voltage is applied to the noninverting input of amplifier 40 where it is added to the VIRS. The output of amplifier 40 is compensated VIRS 70. VIRS 70 is routed to electronic switch 75 which switches between VIRS 70 and the clamped program video signal 60. Switch 75 is preferably an electronic switch which normally connects the clamped program video 60 to output terminal 80 except during a particular line (typically 19) of the vertical interval of the television signal. During line 19, control signal 65 from the insertion logic circuitry (not shown) causes switch 75 to switch VIRS 70 to output terminal 80.

Referring now to FIG. 2, therein is a more detailed block diagram of the present invention. Program video 20 is coupled to clamping circuit 100 which is illustrated in more detail than previously shown. As mentioned before clamping circuit 100 is a slow clamp. Such clamps are well known to those skilled in the art. A slow clamp, utilizing feedback such as clamping circuit 100, is described in "An Improved Television Clamp Circuit Employing Feedback", K. R. Wendt and W. K. Squires, *Convention Record of the IRE*, part 7, pp. 79–84, Mar. 22–25, 1954. Although the preferred embodiment uses a feedback clamp, any type of slow clamp may be used. The clamp utilized in the preferred embodiment comprises amplifiers 110, 120 and 130 and sample-and-hold device 200. The program video 20 is first coupled to amplifier 110 which is configured as an inverting amplifier. The inverted program video is sampled by sampling element 200.

Sampling element 200 comprises a sample gate 140 and a memorizing device 145. This gate and device can be any of those known by those skilled in the art. A clamp pulse 95, from a clamp pulse generator (not shown) which generates a pulse during the back porch time of the inverted program video, closes gate 140. Memory device 145, illustrated as a capacitor, "remembers" the reference point between samples (i.e., when gate 140 is open). The sampled error is amplified and integrated by amplifiers 130 and 120 and fed back to the input of amplifier 110 where it is summed with program video signal 20. By way of operation this type of clamp samples the error in the program video signal dc level, amplifies it and subtracts it from the video program signal to provide correction. This approach permits a very short time constant for the sampling element, while the time constant of the feedback loop can be such that integration of the error signal is possible. Consequently, good performance in the presence of noisy program video signals is obtained and the correction is applied smoothly and slowly.

The clamped program video signal 60 is applied to the noninverting input of differential amplifier 90 the output of which is applied to one input of switch 75. The output of sampling element 200 is applied to the noninverting input of differential amplifier 40. The VIRS 30 (or any other signal) to be inserted onto the program video signal is applied to the inverting input of differential amplifier 40. The VIRS is available from the previously described VIRS signal generator. The effect of amplifier 40 is to add the error signal 50 to the blanking level of the VIRS. Thus, the clamped program video signal 60 and the compensated VIRS 70 from amplifier 40 have precisely matched blanking levels and the noise which would have normally been added to the dc level of the program video signal 60 is now added to the VIRS. The noise added to the inserted video signal is not visible in the television screen. Furthermore, the inserted video signal may be used by a conventional video corrector in which case the noise is averaged out.

As previously mentioned, switch 75 is preferably an electronic switch to route the clamped program video 60 to the output terminal 80, except when compensated VIRS 70 is to be inserted during the vertical interval of the television signal. Switch 75 is controlled by a control signal 65 from insertion logic circuitry (not shown).

It may be observed in the foregoing specification that such specification has not been burdened by the inclusion of large amounts of detail and specific information relative to matters as specific circuitry, timing, and the like since all such information is well within the skill of the art. Examples of publications that relate to such aspects as set forth above and are incorporated herein by reference are: *Television Waveform Processing Circuits,* G. A. Eastman, copyright 1968, Tektronix, Inc. and *Using The Vertical Interval Reference Signal,* copyright 1973, Tektronix, Inc.

While there has been shown and described a preferred embodiment of the present invention, it will be apparent to those skilled in the art that many changes and modifications may be made without departing therefrom in its broader aspects. Therefore, the appended claims are intended to cover all such changes and modifications as fall within the scope of the invention.

We claim as our invention:

1. An apparatus for matching the blanking level of a first video signal to a second video signal wherein said first video signal is being inserted on said second video signal, the apparatus comprising:
    a clamping circuit coupled to receive said second video signal and clamp said second video signal to a predetermined dc voltage level, said clamping circuit also produces an error voltage representative of the residual error of said clamping circuit;
    means for combining coupled to receive said error voltage and said first video signal to produce a compensated first video signal; and
    switching between means for switching said clamped second video signal and said compensated first video signal to an output terminal at the command of control signal.

2. The apparatus according to claim 1 wherein said first video signal is a vertical interval reference signal.

3. The apparatus according to claim 2 wherein said second video signal is a television program video signal.

4. The apparatus according to claim 3 wherein said switching means connects said vertical interval reference signal to said output terminal during a predetermined line of said television program video signal.

5. The apparatus according to claim 1 wherein said clamping circuit comprises a slow clamp.

6. The apparatus according to claim 5 wherein said slow clamp comprises a feedback clamp.

7. The apparatus according to claim 1 wherein said switching means comprises an electronic switch.

8. In an apparatus for matching the blanking levels of a first video signal and a second video signal wherein one of said video signals is to be inserted on the other one thereof, the improvement comprising:
    varying the blanking level of the inserted signal to match the blanking level of the other signal.

9. The apparatus according to claim 8 wherein said inserted signal comprises a vertical interval reference signal and said other signal comprises a television program video signal.

10. Apparatus for matching the blanking level of a second video signal to the blanking level of a first video signal before combination thereof, comprising:
    circuit means for clamping said first video signal to a predetermined voltage level and for generating an error signal representative of any difference between said predetermined voltage level and said clamped voltage level; and
    means for combining said error signal and said second video signal to match the blanking level of said second video signal to the blanking level of said clamped first video signal.

* * * * *